(12) United States Patent
Lee et al.

(10) Patent No.: US 12,125,640 B2
(45) Date of Patent: Oct. 22, 2024

(54) CAPACITOR COMPONENT AND MANUFACTURING METHOD OF CAPACITOR COMPONENT

(71) Applicant: SAMSUNG ELECTRO-MECHANICS CO., LTD., Suwon-si (KR)

(72) Inventors: Kyu Ho Lee, Suwon-si (KR); Woon Kyung Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 30 days.

(21) Appl. No.: 17/706,010

(22) Filed: Mar. 28, 2022

(65) Prior Publication Data

US 2023/0127398 A1 Apr. 27, 2023

(30) Foreign Application Priority Data

Oct. 26, 2021 (KR) .................. 10-2021-0143850

(51) Int. Cl.
*H01G 4/01* (2006.01)
*H01G 4/33* (2006.01)
(52) U.S. Cl.
CPC ............... *H01G 4/01* (2013.01); *H01G 4/33* (2013.01)
(58) Field of Classification Search
CPC .. H01G 4/06; H01G 4/33; H01G 4/00; H01G 4/01
See application file for complete search history.

(56) References Cited

U.S. PATENT DOCUMENTS

| | | | | |
|---|---|---|---|---|
| 3,286,136 | A * | 11/1966 | McLean | B22F 7/06 29/25.03 |
| 8,978,415 | B2 | 3/2015 | Adar et al. | |
| 9,012,092 | B2 * | 4/2015 | Laor | H01M 4/806 429/235 |
| 2013/0224394 | A1 * | 8/2013 | Hanbuecken | B05D 5/12 977/948 |
| 2013/0250479 | A1 * | 9/2013 | Manohara | H01G 4/242 361/321.5 |
| 2016/0032475 | A1 | 2/2016 | Huyhebaert et al. | |
| 2017/0222216 | A1 | 8/2017 | Woo et al. | |
| 2017/0309404 | A1 * | 10/2017 | Watanabe | H01G 4/232 |
| 2019/0027309 | A1 * | 1/2019 | Lee | H01G 4/005 |

(Continued)

FOREIGN PATENT DOCUMENTS

| | | |
|---|---|---|
| JP | 2004-363186 A | 12/2004 |
| JP | 2016058618 A * | 4/2016 |
| KR | 2007109465 A * | 11/2007 |

(Continued)

*Primary Examiner* — David M Sinclair
(74) *Attorney, Agent, or Firm* — MORGAN, LEWIS & BOCKIUS LLP

(57) ABSTRACT

A capacitor component includes: a plurality of conductive nanowires disposed to be spaced apart from each other; first and second connecting conductive layers respectively disposed on one end and the other end of the plurality of conductive nanowires, and connected to the plurality of conductive nanowires; a conductive body surrounding the plurality of conductive nanowires; and a dielectric film disposed between the plurality of conductive nanowires, each of the first and second connecting conductive layers, and the conductive body.

25 Claims, 15 Drawing Sheets

(56) References Cited

U.S. PATENT DOCUMENTS

2019/0096587 A1  3/2019  Shin et al.

FOREIGN PATENT DOCUMENTS

| KR | 10-2016-0016668 A | 2/2016 |
| KR | 10-1773103 B1 | 8/2017 |
| KR | 10-1922116 B1 | 11/2018 |
| KR | 10-2019-0037045 A | 4/2019 |

* cited by examiner

CAPACITOR COMPONENT AND MANUFACTURING METHOD OF CAPACITOR COMPONENT

CROSS-REFERENCE TO RELATED APPLICATION(S)

This application claims benefit of priority to Korean Patent Application No. 10-2021-0143850 filed on Oct. 26, 2021 in the Korean Intellectual Property Office, the disclosure of which is incorporated herein by reference in its entirety.

TECHNICAL FIELD

The present disclosure relates to a capacitor component and a manufacturing method of the same.

BACKGROUND

In accordance with technological development, there has been increasing demand for a chip-type electronic component implementing high capacitance while having a reduced volume.

As an information technology (IT) products have tended to be smaller and multifunctionalized in recent years, a capacitor included in the IT product is thus also required to have a smaller size and high capacitance.

In accordance with this trend, a multilayer capacitor has been developed to include a dielectric layer having a high dielectric constant, and simultaneously, to include the dielectric layer and an internal electrode which are formed to be ultra-thin.

However, the multilayer capacitor is currently approaching the limit of capacitance per unit volume due to a reduced breakdown voltage (BDV) caused by such a low thickness and a structural capacitance limitation of a surface-stack method.

In order to solve this problem, provided is a three-dimensional capacitor implementing a high integration rate by including an electrode pillar.

In order to have the higher integration rate, the three-dimensional capacitor is required to have an increased slenderness ratio (or aspect ratio, i.e. length/thickness) of a vertical pattern thereof.

However, the prior art has a limitation in increasing the slenderness ratio. The reason for the limitation in this slenderness ratio is due to a manufacturing method of a capacitor according to the prior art.

The prior art three-dimensional capacitor may be manufactured using an etching method or a growth method.

In the case of the etching method among these methods, time required for manufacturing the capacitor may be increased exponentially rather than linearly as the capacitor has a higher slenderness ratio.

When the slenderness ratio is greater than 30:1, the capacitor may be generally determined to cross a threshold value in terms of manufacturing time/costs.

In the case of the growth method, a problem may occur in the capacitor in terms not only of manufacturing time thereof, but also quality. The higher slenderness ratio of the capacitor, the more problems such as a lifted, biased or collapsed pattern occur, thereby drastically reducing yield thereof.

SUMMARY

An aspect of the present disclosure may provide a capacitor component which may overcome a problem that a three-dimensional capacitor of the prior art has a limitation in implementing a small size and high capacitance, by including a conductive nanowire bundle, and a manufacturing method of the same.

According to an aspect of the present disclosure, a capacitor component may include: a plurality of conductive nanowires disposed to be spaced apart from each other; first and second connecting conductive layers respectively disposed on one end and the other end of the plurality of conductive nanowires, and connected to the plurality of conductive nanowires; a conductive body surrounding the plurality of conductive nanowires; and a dielectric film disposed between the plurality of conductive nanowires, each of the first and second connecting conductive layers, and the conductive body.

According to another aspect of the present disclosure, a capacitor component may include: a first electrode portion including a plurality of conductive nanowires respectively extended in a first direction and spaced apart from each other in a second direction, perpendicular to the first direction; first and second connecting conductive layers respectively disposed on upper and lower ends of the plurality of conductive nanowires to connect the plurality of conductive nanowires to each other; a dielectric film surrounding a side surface of each of the plurality of conductive nanowires; and a second electrode portion filling a space in which the plurality of conductive nanowires are arranged to be spaced apart from each other between the first and second connecting conductive layers, and surrounding a side surface of the dielectric film.

According to another aspect of the disclosure, a capacitor component may include: a plurality of conductive nanowires spaced apart from each other; a first dielectric film surrounding a side surface of each of the plurality of conductive nanowires; a barrier metal film surrounding a periphery of the dielectric film; a barrier dielectric film surrounding a periphery of the barrier metal film; first and second connecting conductive layers respectively disposed on one end and the other end of the plurality of conductive nanowires, and connected to the plurality of conductive nanowires; and a conductive body surrounding the plurality of conductive nanowires.

BRIEF DESCRIPTION OF DRAWINGS

The above and other aspects, features and advantages of the present disclosure will be more clearly understood from the following detailed description taken in conjunction with the accompanying drawings, in which.

DETAILED DESCRIPTION

Figure 1:
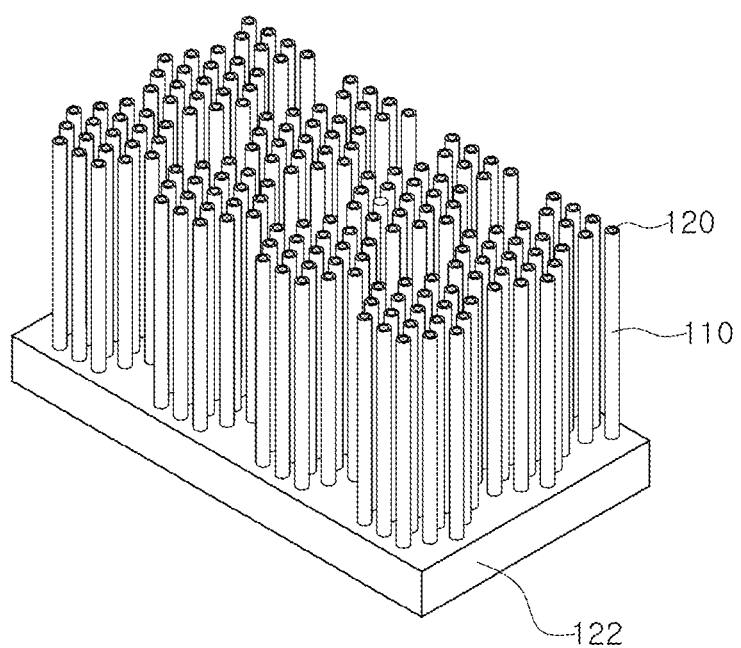
FIG. 1 is a view schematically illustrating a second connecting conductive layer, a conductive nanowire and a dielectric film, included in a capacitor component according to an exemplary embodiment of the present disclosure.

Hereinafter, exemplary embodiments of the present disclosure will now be described in detail with reference to the accompanying drawings.

X, Y and Z directions shown in the drawings may respectively indicate the length, width and thickness directions of a capacitor component.

Figure 2:
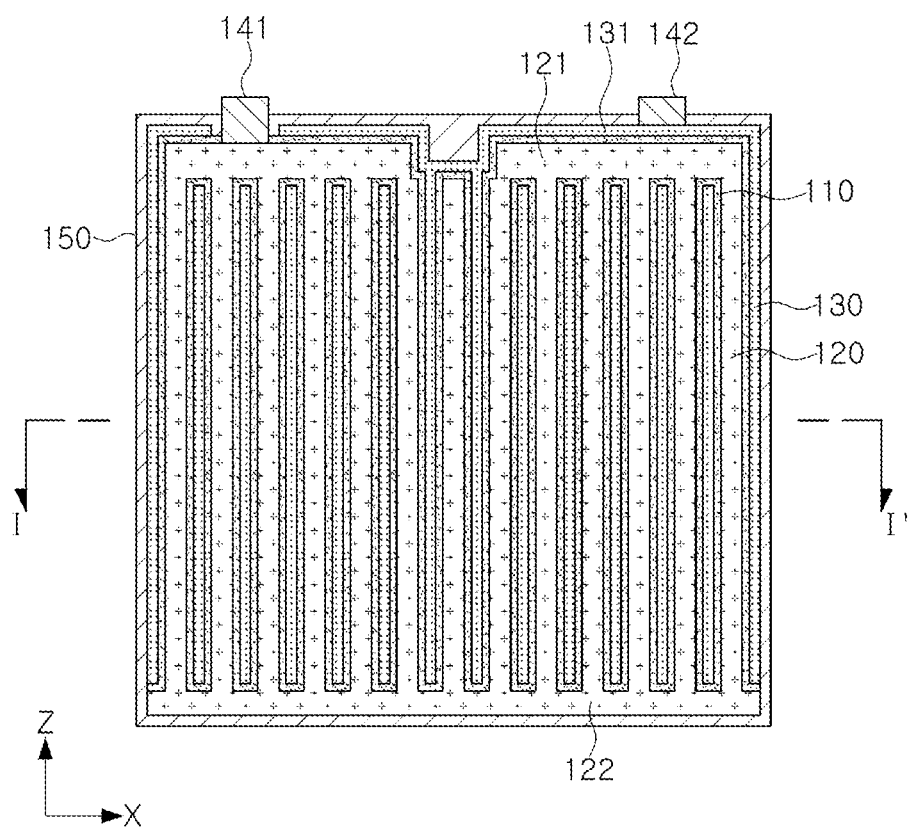
FIG. 2 is a view schematically illustrating the capacitor component according to an exemplary embodiment of the present disclosure.
Figure 3:
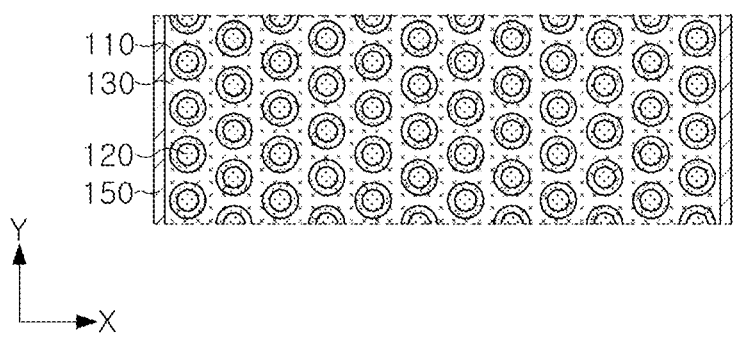
FIG. 3 is a cross-sectional view taken along line I-I' of FIG. 2.

FIG. 1 is a view schematically illustrating a second connecting conductive layer, a conductive nanowire and a dielectric film, included in a capacitor component according to an exemplary embodiment of the present disclosure; FIG. 2 is a view schematically illustrating the capacitor component according to an exemplary embodiment of the present disclosure; FIG. 3 is a cross-sectional view taken along line I-I' of FIG. 2; and FIGS. 4 through 7 are views respectively schematically illustrating an arrangement of the conductive nanowire bundle in a capacitor component according to an exemplary embodiment of the present disclosure.

Referring to FIGS. 1 through 4, a capacitor component 1 according to the present embodiment may include a plurality of conductive nanowires 120 serving as a first electrode portion, first and second connecting conductive layers 121 and 122, a dielectric film 110, a conductive body 130 serving as a second electrode portion, first and second terminals 141 and 142 and a protective layer 150.

The first electrode portion may include the plurality of conductive nanowires 120. Each of the plurality of conductive nanowires 120 may each be extended in the Z direction and disposed to be spaced apart from each other in the X direction and/or the Y direction, perpendicular to the Z direction. Meanwhile, hereinafter, the first electrode portion is indicated as the plurality of conductive nanowires 120.

The plurality of conductive nanowires 120 may be physically and electrically connected to each other by the first and second connecting conductive layers 121 and 122, described below.

Each conductive nanowire 120 may be formed of a conductive material. As an example to which the present disclosure is not limited, each conductive nanowire 120 may include a metal including at least one of nickel (Ni), cobalt (Co), titanium (Ti), tungsten (W), palladium (Pd) and copper (Cu) or alloys thereof. Alternatively, each conductive nanowire 120 may include a conductive ceramic material such as titanium nitride (TiN) or tungsten nitride (WN).

Each conductive nanowire 120 may have, for example, an amorphous multiphase structure including a crystalline alloy, an amorphous alloy or a nano-sized grain. For example, a crystal structure of the conductive nanowire 120 may be controlled by controlling an environment (e.g., cooling rate, drawing rate) in which the conductive nanowire 120 is drawn. However, the present disclosure is not limited thereto.

The plurality of conductive nanowires 120 may have materials which are the same as or different from each other. For example, each of the plurality of conductive nanowires 120 may be a nickel (Ni) nanowire. For another example, some of the plurality of conductive nanowires 120 may be the nickel (Ni) nanowires, and the rest of the plurality of conductive nanowires 120 may be copper (Cu) nanowires.

For yet another example, the plurality of conductive nanowires 120 may include metal nanowires, alloy nanowires and the conductive ceramic nanowires.

The plurality of conductive nanowires 120 may each have a shape of at least one of a circular pillar and a polygonal pillar. For example, each of the plurality of conductive nanowires 120 may have the shape of a circular pillar. For another example, each of the plurality of conductive nanowires 120 may have the shape of a polygonal pillar. For yet another example, some of the plurality of conductive nanowires 120 may each have the shape of a circular pillar, and the rest of the plurality of conductive nanowires 120 may each have the shape of a polygonal pillar.

10 μm or less or 2 μm or less may be an average diameter of the plurality of conductive nanowires 120. For example, the average diameter of the plurality of conductive nanowires 120 may indicate an arithmetic average of values obtained by performing a plurality of measurements on any one conductive nanowire 120 shown in an image along the Z direction, in which the image is obtained by capturing an XZ cross section of the capacitor component 1 from its center in the Y direction by using an optical microscope or a scanning electron microscope (SEM). Here, the plurality of measurements performed along the Z direction may indicate the measurements performed at equal intervals in the Z direction, and are not limited thereto. Alternatively, the average diameter may indicate a value obtained in such a manner that diameters of at least three or more conductive nanowires 120 shown in the image are respectively measured by using the above-described method and these diameters are then averaged arithmetically. For another example, the average diameter of the plurality of conductive nanowires 120 may indicate an arithmetic average of diameters of at least three or more conductive nanowires 120 shown in an image, in which the image is obtained by capturing an XY cross section of the capacitor component 1 from its center in the Z direction by using the optical microscope or the scanning electron microscope (SEM). Meanwhile, when the shape of the conductive nanowire 120 shown in the XY cross-sectional image is not circular, the diameter of the conductive nanowire 120 may mean the diameter of a circle assuming the circle has the same area as the nanowire.

10% or less may be a ratio of a difference between an average diameter of one end (in an upper direction of FIG. 1) of the plurality of conductive nanowires 120 and an average diameter of the other end (in a lower direction of FIG. 1) of the plurality of conductive nanowires 120 to the average diameter of the plurality of conductive nanowires 120. The plurality of conductive nanowires 120 used in this exemplary embodiment may be manufactured by a drawing method, unlike a general nanowire obtained by selectively growing the conductive material. Accordingly, in the case of the plurality of conductive nanowires 120 used in this exemplary embodiment, the average diameters of one end and the other end may have a relatively small difference, unlike those of the general nanowire.

100 μm or more may be an average distance (i.e. numerical value in the Z direction) from the one end of the plurality of conductive nanowires 120 to the other end thereof. A length (i.e. dimension in the Z direction) of each of the plurality of conductive nanowires 120 may be determined by a thickness of a diced wafer described below, and may be 1000 μm or more if necessary. For example, the length (i.e. dimension in the Z direction) of each of the plurality of conductive nanowires 120 may indicate a value obtained in such a manner that dimensions of at least three or more conductive nanowires 120 shown in the image are respectively measured by using the above-described method and these diameters are then averaged arithmetically, in which the image is obtained by capturing the XZ cross section of the capacitor component 1 from its center in the Y direction by using the optical microscope or the scanning electron microscope (SEM).

Figure 4:
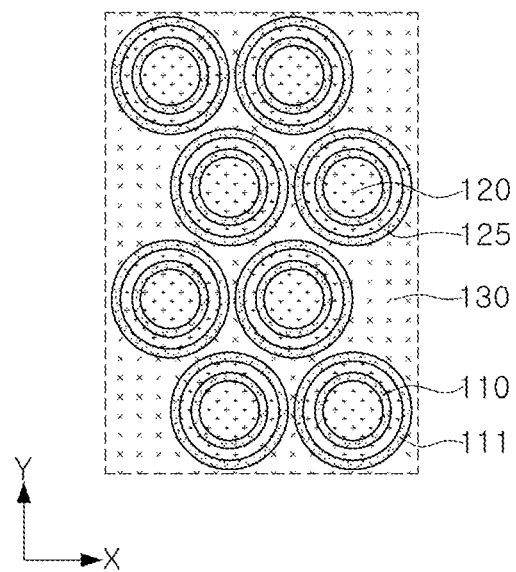
FIGS. 4 through 7 are views each schematically illustrating an arrangement of the conductive nanowire bundle in a capacitor component according to an exemplary embodiment of the present disclosure.
Figure 5:
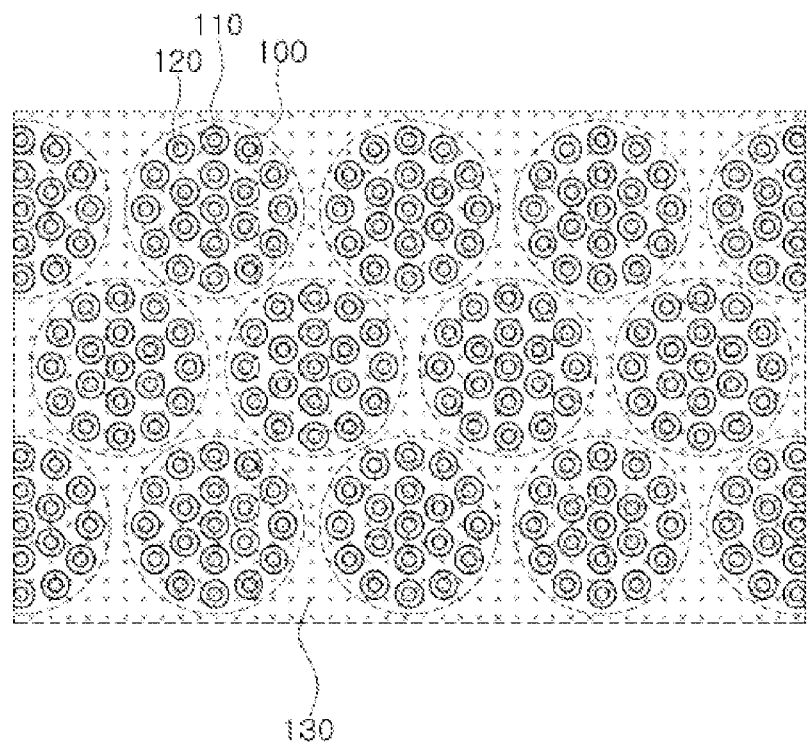
Figure 6:
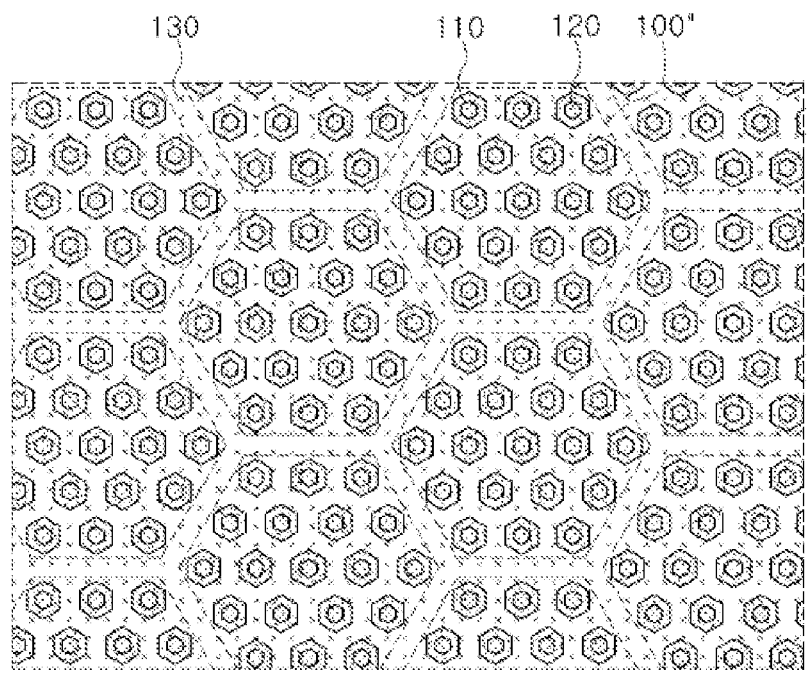
Figure 7:
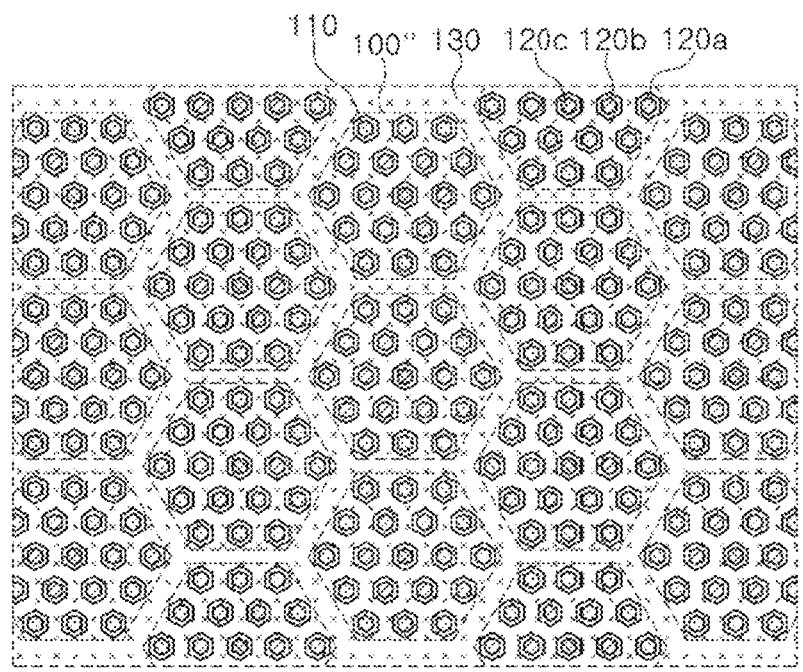

The plurality of conductive nanowires 120 may be bundled with each other to be a plurality of conductive nanowire bundles 100, and the plurality of conductive nanowire bundles 100 may be arranged in a repeating pattern. For example, as shown in FIGS. 4 and 7, the plurality of conductive nanowire bundles 100 and 100''' may each have a generally circular cross-section. In addition, as shown in FIGS. 5 and 6, a plurality of conductive nanowire bundles 100' and 100'' may each have a generally hexagonal cross-section. Further, as shown in FIGS. 4 through 7, the plurality of conductive nanowire bundles 100, 100', 100'' and 100''' may form a pattern in which bundles of the circular cross-section or the hexagonal cross-section are repeatedly arranged.

In any one of the conductive nanowire bundles 100, 100', 100'' and 100''', one of the conductive nanowires 120 and another one of the conductive nanowires 120 may have different average diameters, different materials, or, different cross-sectional shapes. For example, as shown in FIG. 6, the nanowire bundle 100'' may include conductive nanowires 120a, 120b and 120c, having conductive materials different from each other. In this case, the conductive nanowires 120a, 120b and 120c in the bundle may have the same shape. For another example, as shown in FIG. 7, the nanowire bundle 100''' may include conductive nanowires 1210 and 1220 having different average diameters, in which the conductive nanowire 1210 having a larger average diameter may be disposed at a center of the bundle 100''' and the conductive nanowire 1220 having a smaller average diameter may be disposed on a periphery of the bundle 100'''.

The first connecting conductive layer 121 may be disposed on one end of the plurality of conductive nanowires 120 to connect the plurality of conductive nanowires 120 to each other, and the second connecting conductive layer 122 may be disposed on the other end of the plurality of conductive nanowires 120 to connect the plurality of conductive nanowires 120 to each other. The connecting conductive layer 121 or 122 may entirely have a shape of a plate by being extended from upper or lower end of the plurality of conductive nanowires 120 in an XY plane to cover either end of the plurality of conductive nanowires 120. The connecting conductive layers 121 and 122 may connect the plurality of conductive nanowires 120 to each other in parallel.

The connecting conductive layer 121 or 122 may include the conductive material. As an example to which the present disclosure is not limited, the connecting conductive layer 121 or 122 may include the metal including at least one of nickel (Ni), cobalt (Co), titanium (Ti), tungsten (W), palladium (Pd) and copper (Cu) or alloys thereof. Alternatively, the connecting conductive layer 121 or 122 may include the conductive ceramic material such as titanium nitride (TiN) or tungsten nitride (WN). The connecting conductive layer 121 or 122 and the conductive nanowire 120 may be formed of the same material as each other, and for example, the connecting conductive layer 121 or 122 and the conductive nanowire 120 may each be formed of nickel (Ni).

The connecting conductive layer 121 or 122 may be formed by, for example, a thin film process such as vapor deposition, a plating process, a stack process of stacking a conductive film or the like, and is not limited thereto.

The conductive body 130 may surround the plurality of conductive nanowires 120. The conductive body 130 may form an overall appearance of the capacitor component 1 according to this exemplary embodiment, and serve as the second electrode portion of the capacitor component 1. That is, the dielectric film 110 described below may be disposed between each of the plurality of conductive nanowires 120 and the conductive body 130, and electric charges of different polarities may be applied to each of the plurality of conductive nanowires 120 and the conductive body 130, thereby forming capacitance in the dielectric film 110.

The conductive body 130 may fill a space in which the plurality of conductive nanowires 120 are arranged spaced apart from each other, and here, each of the plurality of conductive nanowires 120 may have a side surface covered by the dielectric film 110 described below. In addition, the conductive body 130 may be formed on an upper surface of the first connecting conductive layer 121 connecting one ends of the plurality of conductive nanowires 120 to each other. The conductive body 130 may not be disposed on the second connecting conductive layer 122 connecting the other ends of the plurality of conductive nanowires 120 to each other, and a scope of this exemplary embodiment is not limited thereto.

The conductive body 130 may be formed of the conductive material. As an example to which the present disclosure is not limited, the conductive body 130 may include the metal including at least one of nickel (Ni), cobalt (Co), titanium (Ti), tungsten (W), palladium (Pd) and copper (Cu) or alloys thereof. Alternatively, the conductive body 130 may include the conductive ceramic material such as titanium nitride (TiN) or tungsten nitride (WN).

The conductive body 130 may be formed by, for example, the thin film process such as the vapor deposition, the plating process or the like, and is not limited thereto. As an example to which the present disclosure is not limited, the conductive body 130 may be formed by atomic layer deposition (ALD).

The dielectric film 110 may cover each periphery of the plurality of conductive nanowires 120, and may be disposed between each of the plurality of conductive nanowires 120 and the conductive body 130. That is, the dielectric film 110 may serve as a separator to prevent an electrical short circuit occurring between each of the plurality of conductive nanowires 120 and the conductive body 130. As described above, the both ends of the conductive nanowire 120 may respectively be in contact and connected to the connecting conductive layers 121 and 122. Therefore, the dielectric film 110 may not be disposed between each end of the conductive nanowire 120 and the connecting conductive layer 121 or 122. In addition, the dielectric film 110 may be disposed between the connecting conductive layer 121 or 122 and the conductive body 130. Meanwhile, an entire surface of the first connecting conductive layer 121 may be covered by the dielectric film 110, unlike that of the second connecting conductive layer 122.

The dielectric film 110 may include, for example, a high-K material having a Relative dielectric constant of 3 or more. As an example to which the present disclosure is not limited, the dielectric film 110 may include at least one oxide selected from the group consisting of tantalum (Ta), titanium (Ti), lanthanum (La), zirconium (Zr), barium (Ba), silicon (Si) and hafnium (Hf). As an example to which the present disclosure is not limited, the dielectric film 110 may be a multilayer film. In this case, the dielectric film 110 may be a double-layered film in which an oxide film including the above-described oxide and a nitride film including a nitride such as silicon nitride (SiN) are sequentially disposed.

The dielectric film 110 may be formed by, for example, the vapor deposition such as the atomic layer deposition (ALD) or chemical vapor deposition (CVD), and is not limited thereto.

The protective layer 150 may cover the conductive body 130 and the second connecting conductive layer 122. The protective layer 150 may serve to protect the capacitor component 1 from external impacts or conductive foreign materials.

The protective layer 150 may include, for example, a thermoplastic resin such as polystyrene, vinyl acetate, polyester, polyethylene, polypropylene, polyamide, rubber or acryl, a thermosetting resin such as phenol, epoxy, urethane, melamine or alkyd, a photosensitive resin, parylene, silicon dioxide ($SiO_x$) or silicon nitride ($SiN_x$).

The protective layer 150 may be formed by, for example, applying a liquid insulating resin, stacking an insulating film, or using the vapor deposition. When formed by using the insulating film, the protective layer 150 may use a dry film (DF) including a photosensitive insulating resin, an Ajinomoto build-up film (ABF) not including the photosensitive insulating resin or a polyimide film.

The first terminal 141 may be connected to the first connecting conductive layer 121, and its portion may be exposed outwardly of the protective layer 150 to be a positive or negative electrode. The second terminal 142 may be connected to the conductive body 130, and its portion may be exposed outwardly of the protective layer 150 to be a positive or negative electrode whose polarity is different from that of the first terminal 141.

The terminal 141 or 142 may be formed of a conductive material including at least one of copper (Cu), silver (Ag), nickel (Ni) and tin (Sn). The terminal 141 or 142 may be formed by at least one of a paste printing process, the plating process or the thin film process such as the vapor deposition, and the present disclosure is not limited thereto. The multilayer terminal 141 or 142 may be formed, and the present disclosure is not limited thereto.

Figure 8:
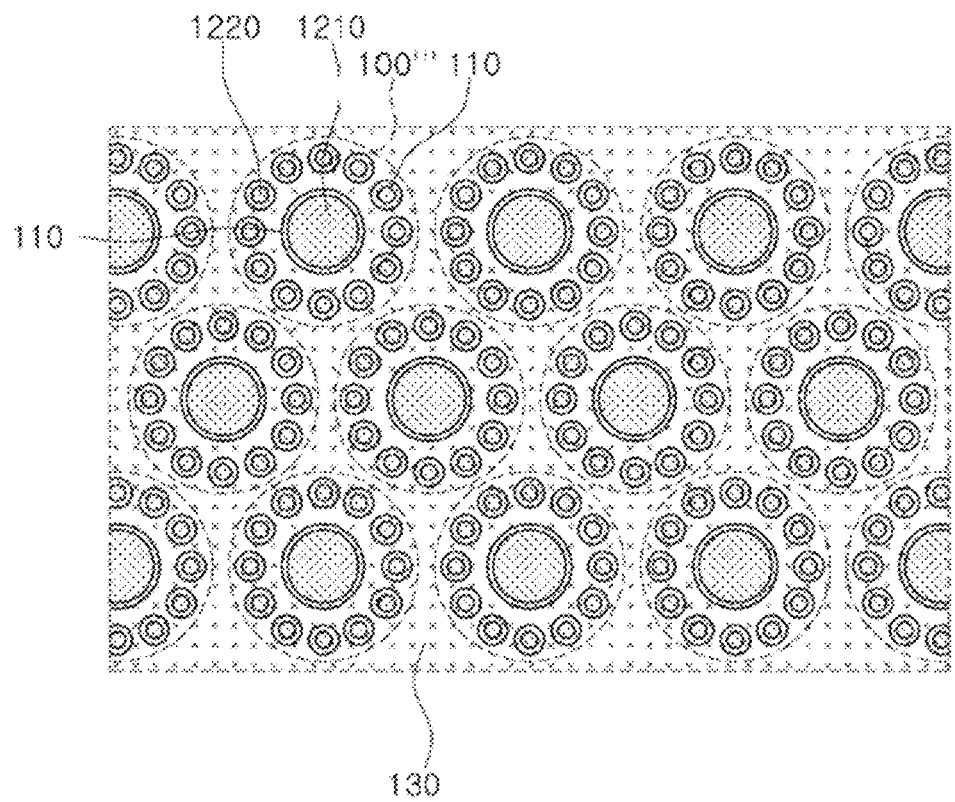
FIG. 8 is a view schematically illustrating a cross section of a capacitor component according to another exemplary embodiment of the present disclosure.

FIG. 8 is a view schematically illustrating a cross section of a capacitor component according to another exemplary embodiment of the present disclosure.

Referring to FIGS. 1 through 7 and 8, the capacitor component according to another exemplary embodiment of the present disclosure may further include a barrier metal film 125 and a barrier dielectric film 111 as compared to the capacitor component according to an exemplary embodiment of the present disclosure. Therefore, in describing the capacitor component according to this exemplary embodiment, the description is made on only the barrier metal film 125 and the barrier dielectric film 111 which are components different from those of an exemplary embodiment of the present disclosure.

The barrier metal film 125 may surround a periphery (i.e. outer peripheral surface) of the dielectric film 110 surrounding each side surface of the plurality of conductive nanowires 120. In addition, the barrier dielectric film 111 may surround a periphery (outer peripheral surface) of the barrier metal film 125 surrounding the periphery (outer peripheral surface) of the dielectric film 110. That is, the barrier metal film 125 and the barrier dielectric film 111 may be sequentially disposed between the dielectric film 110 and the conductive body 130. The barrier metal film 125 and the barrier dielectric film 111 may block transfer of charges or ions from the dielectric film 110 to the conductive body 130.

Hereinafter, the description describes a method of manufacturing a capacitor component according to an exemplary embodiment of the present disclosure. A capacitor component 1 of the present disclosure may be manufactured in the following order.

Figure 12A:
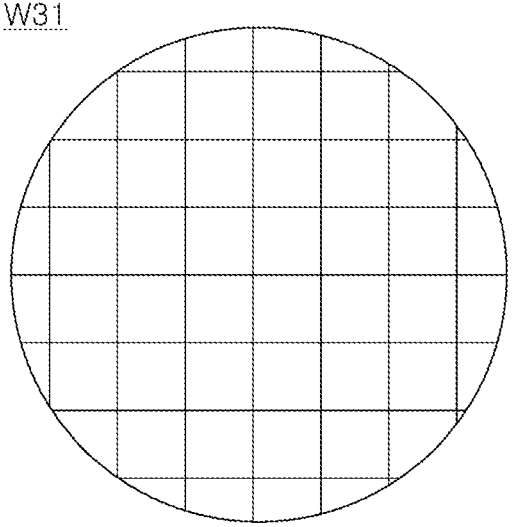
FIGS. 12A through 23 are views showing a manufacturing process of the capacitor component according to an exemplary embodiment of the present disclosure.
Figure 12B:
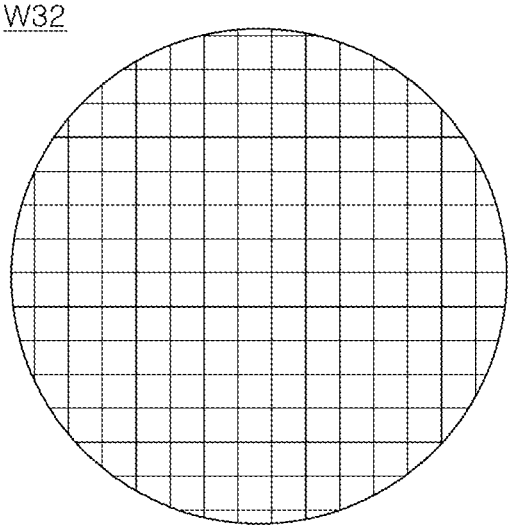
Figure 13:
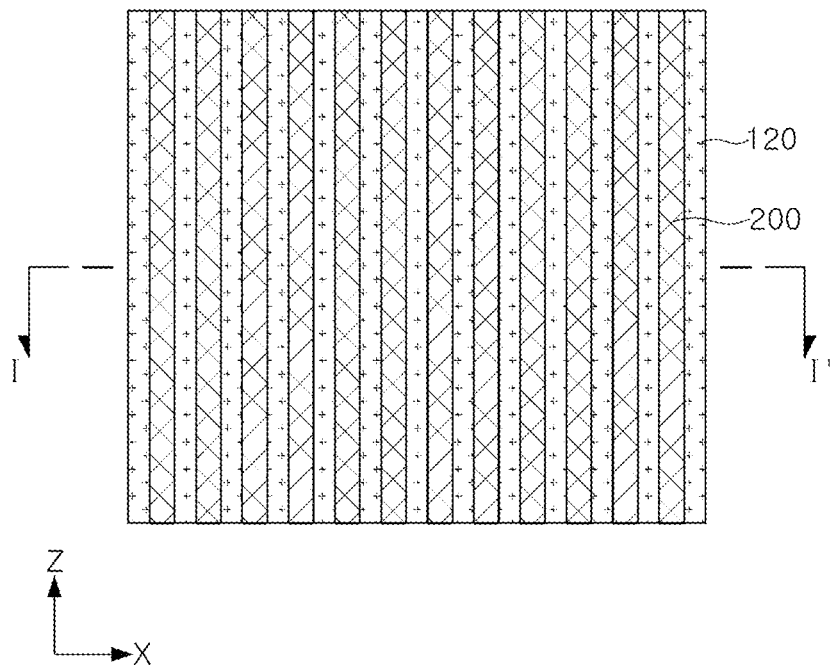

Referring to FIGS. 12 and 13, it may be necessary to first prepare a nanowire bundle including a plurality of nanowires 120 covered with glass 200.

In order to prepare the nanowire bundle, the plurality of conductive nanowires may be coated with the glass to draw out the nanowires, and the plurality of drawn nanowires may then be focused in parallel with a binder, thereby preparing a nanowire bundle base.

Here, the nanowire bundle base may be integrated with each other until the number of the nanowires reaches one billion or more.

The nanowire bundle base may thus be heat-treated to harden the binder, thereby manufacturing the nanowire bundle.

In general, the nanowire may include a conductive nanowire (i.e. core) including different components and a cover surrounding the conductive nanowire.

In addition, in the nanowire, the conductive nanowire and the cover may be separated from each other by using a unit that melts the cover, and here, a component having a higher melting point than the cover may be the conductive nanowire. This technology may be used to manufacture the nanowire in which a metal material such as nickel (Ni) is surrounded by the glass.

The nanowire may thus be produced continuously and rapidly as long as raw materials of the metallic conductive nanowire and the glass cover are continuously supplied.

The nanowire may be produced continuously, and thus theoretically have an infinite slenderness ratio. For its mass production, it is possible to make a sort of formwork having a three-dimensional pattern structure in which the nanowire bundles formed by winding and stacking the nanowires are arranged and fixed.

In this exemplary embodiment, a wafer having the three-dimensional structure may be prepared, and the wafer may include the plurality of conductive metal nanowires in which the plurality of nanowires are bundled with each other to be one nanowire bundle, and the nanowire bundle is cut vertically (along a longitudinal axis of a nanowire), sliced into a shape of a thin plate and vertically erected. Here, the glass 200 is a material serving as the binder.

In this way, the three-dimensional structure including the nanowire bundles may be fixed by the heat treatment, cut to any size and processed into a wafer shape. This method may simultaneously process the nanowire bundles in a large area, may thus increase its productivity, and may also be easily used in a conventional fabrication FAB) process.

Here, in the FAB process of a three-dimensional structure manufactured in the wafer shape, it may be easy to replace a component of its basic structure with a necessary component or add another structure to the same.

It is then possible to perform a process of smoothing a surface of the wafer prepared in this way by polishing and wet etching the surface before performing a subsequent process.

Figure 14:
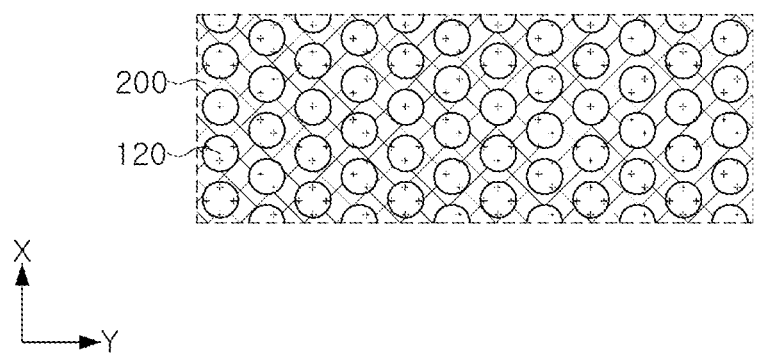

Next, as shown in FIG. 14, a conductive material may be applied on upper and lower ends of the wafer to form a first connecting conductive layer 121 that physically connects the upper ends of the plurality of conductive nanowires 120 formed on an upper surface of the wafer to each other and a second connecting conductive layer 122 that physically connects the lower ends of the plurality of conductive nanowires 120 formed on a lower surface of the wafer.

In an exemplary embodiment, the plurality of conductive nanowires 120 may serve as the first electrode portion.

Figure 15:
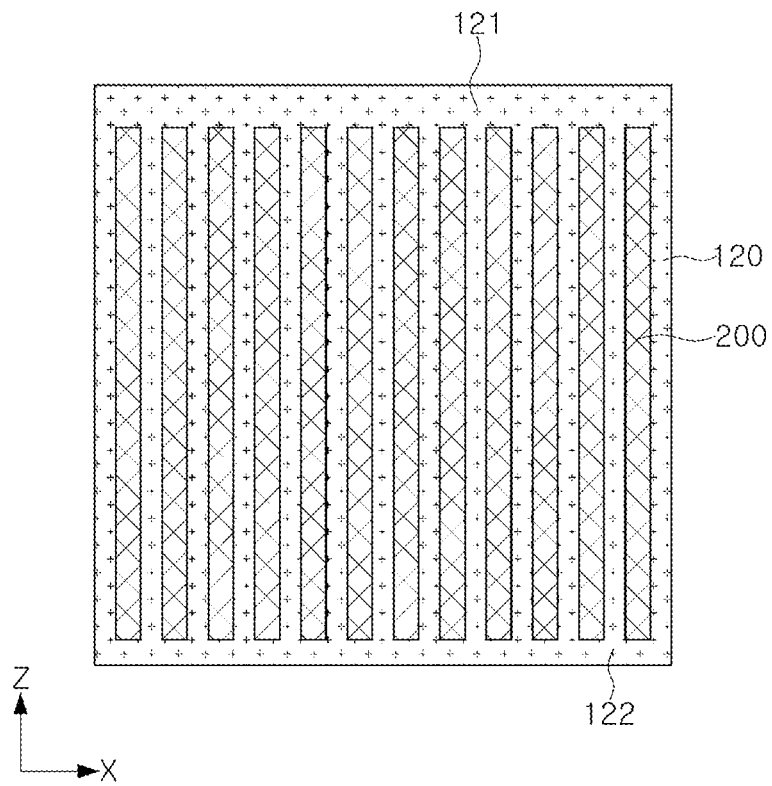

Next, as shown in FIG. 15, in order to per form an advanced micro device (MD) processing in the wafer, a passage 171 connecting the inside and outside of the wafer may be formed by attaching a mask manufactured in a necessary shape to the first connecting conductive layer 121 and then removing a surface of its portion without the mask.

Here, it is possible to control uniformities of unit size and detailed pattern of the wafer by using a shape of the mask.

Figure 16:
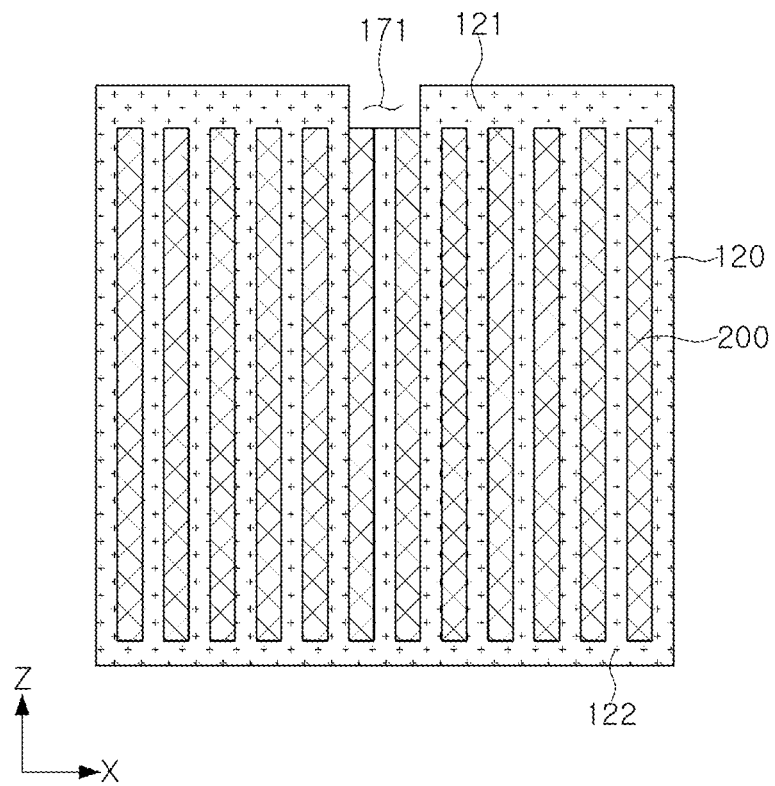
Figure 17:
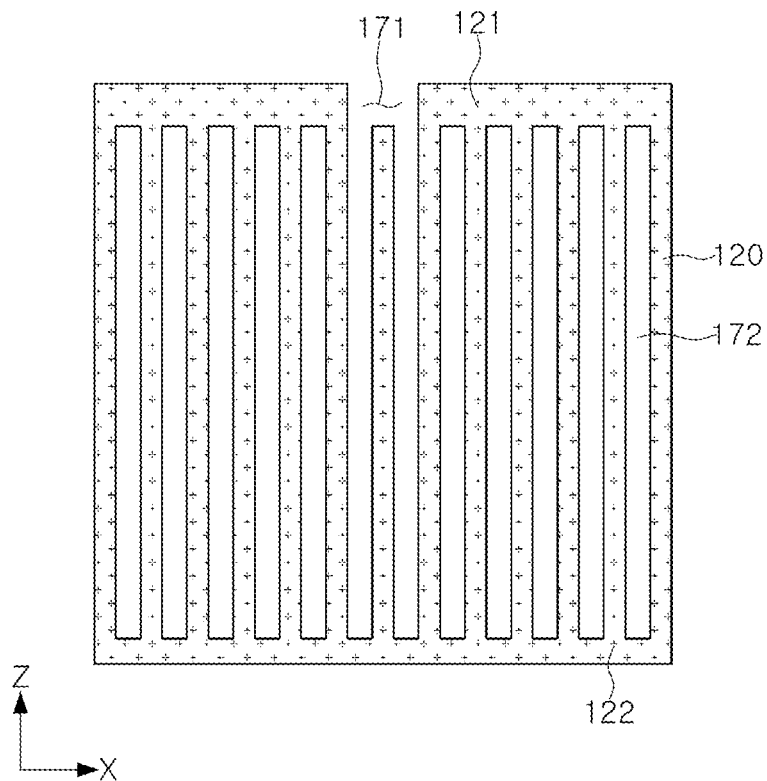

In addition, as shown in FIGS. 16 and 17, a metal wet etch/oxide wet etch process may be performed on the wafer through the passage 171 to remove the glass 200 serving as the binder from the wafer and leave only the conductive nanowire 120, thereby forming a space 172 in the wafer.

Figure 18:
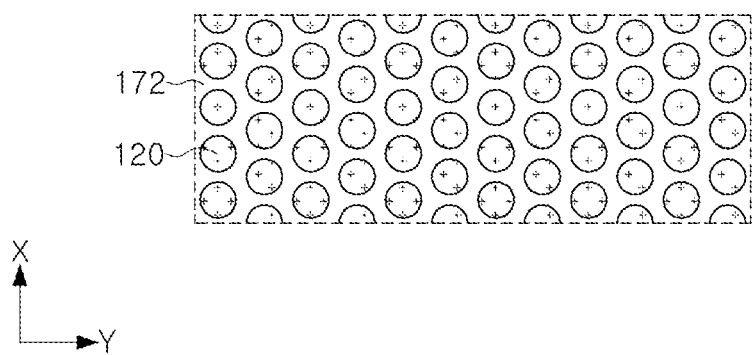
Figure 19:
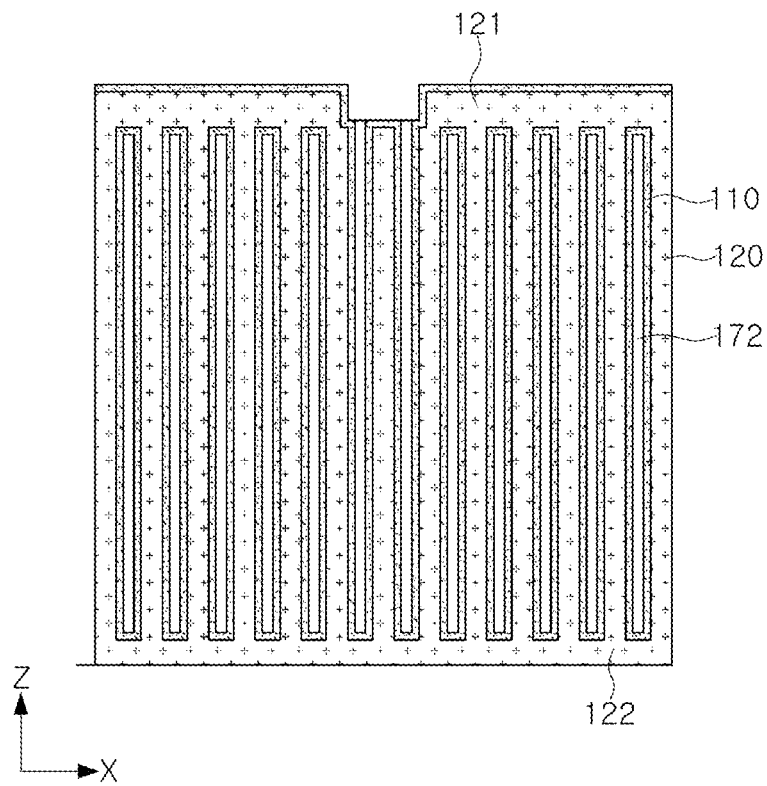

Next, as shown in FIGS. 18 and 19, a dielectric may be deposited in the space 172 in a process such as the atomic layer deposition (ALD) to form a dielectric film 110 on a periphery of each conductive nanowire 120 and an upper surface of the first connecting conductive layer 121.

Here, in some cases, it is possible to form a multilayer pattern in which the conductive nanowire is surrounded with different components by controlling the ALD or repeating etching/deposition.

In addition, this deposition technique using the ALD may finely control a thickness of the pattern, and thus basically manufacture various types of three-dimensional patterns.

For example, a barrier metal film may be further formed to cover a periphery of the dielectric film, and a process of forming a barrier dielectric film may then be further performed by depositing the dielectric once more to cover a periphery of the barrier metal film.

Figure 20:
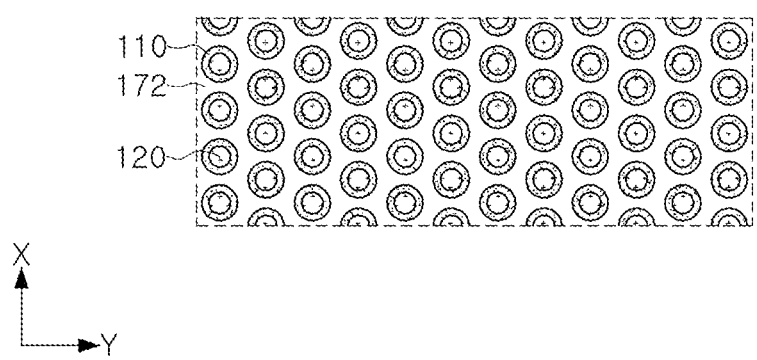
Figure 21:
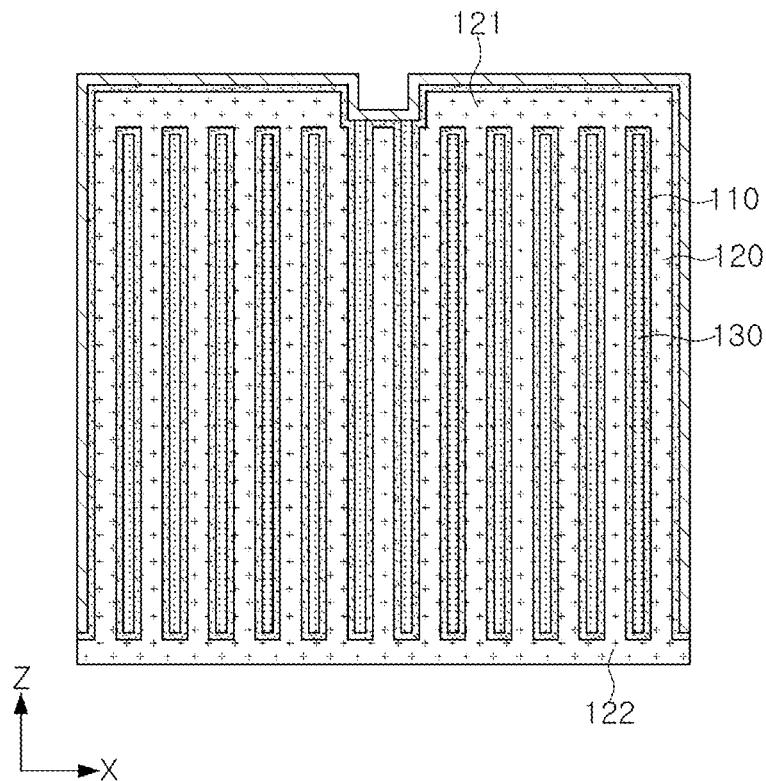

Next, as shown in FIGS. 20 and 21, the conductive material may be additionally deposited in the space 172 prepared in advance by removing the glass 200 and on an upper surface of the dielectric film 110 to form a conductive body 130 connected to the plurality of conductive nanowires 120 by surrounding the same.

Here, the ALD may be used as a method of depositing the conductive material, and the present disclosure is not limited thereto.

In addition, the conductive body 130 may be maintained to be insulated from the plurality of conductive nanowires 120 by the dielectric film 110.

Figure 22:
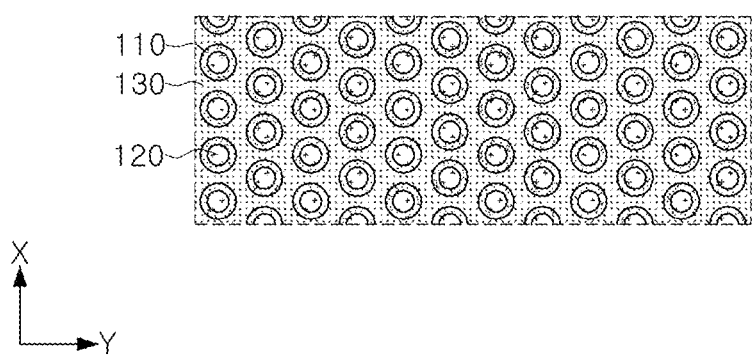
Figure 23:
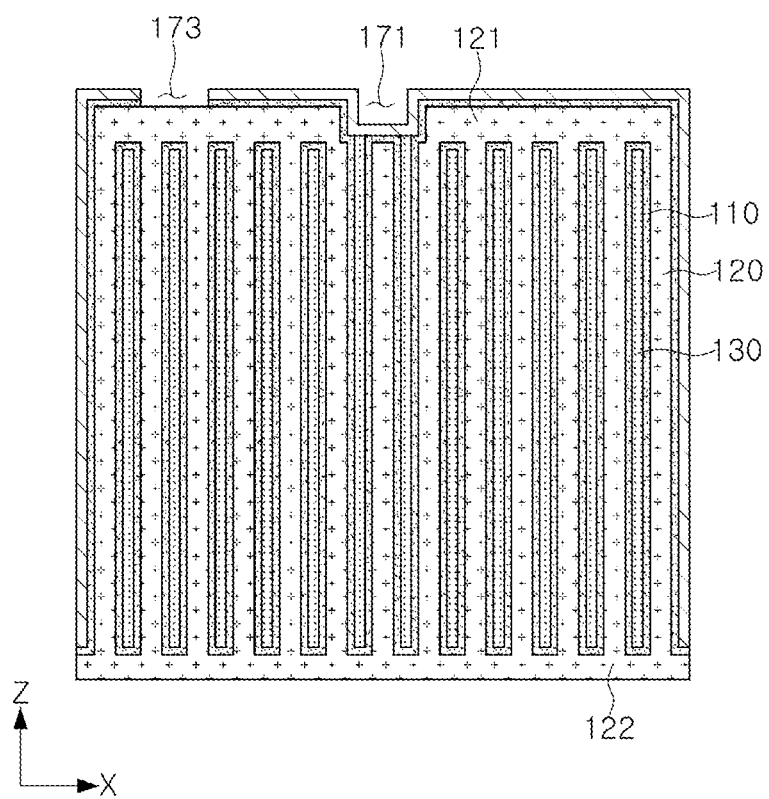

Next, as shown in FIG. 22, in order to form a first terminal 141, shown in FIG. 2, on an upper portion of the wafer, a groove portion 173 may be processed for the first connecting conductive layer 121 to be exposed, and the first terminal 141 may then be formed in the groove portion 173 to be connected to the first connecting conductive layer 121. Here, the first terminal 141 may be disposed spaced apart from the second electrode portion 130.

Next, a second terminal 142 shown in FIG. 2 may be formed on an upper surface 131 of the second electrode portion 130.

Next, a protective layer 150 may be formed to cover the surface of the second electrode portion 130 and the second connecting conductive layer 122 for portions of the first and second terminals 141 and 142 are exposed outwardly, thereby manufacturing the capacitor component 1 of FIG. 2.

In a capacitor component having the three-dimensional structure, manufactured using a prior electrochemical method, an electrode pillar may be made by gradually digging a groove in the entire space by etching, or by gradually creating the electrode pillar by using a growth method in a zero space.

As described above, the prior manufacturing method may be advantageous in terms of a width direction of the capacitor component and disadvantageous in its depth or length direction in that several holes are simultaneously processed or several electrode pillars are simultaneously created.

The capacitor component having the three-dimensional structure may be classified into three types based on its material and manufacturing method. In detail, capacitor component may be classified into a trench type manufactured using silicon (Si) etching, a stack type manufactured using oxygen (Ox) etching, and a silicon-nanowire (Si-NW) type manufactured using Si growing.

In addition, the prior capacitor component having a three-dimensional structure has a limitation caused by processing a base material having the same component.

That is, when processing a continuum formed of the same material into a necessary pattern, there are many constraints in order to process only a necessary portion without affecting surroundings of the pattern.

On the other hand, when the base material includes materials around the necessary pattern and its surroundings different from each other rather than the continuum formed of the same material, it may be relatively much less difficult to change a component included in each pattern into a material actually needed.

The present disclosure may manufacture a wafer having a vertical pattern formed in a necessary shape by using the nanowire bundle including the plurality of conductive nanowires coated with the glass, and may easily manufacture the capacitor component having a three-dimensional structure on this wafer in the FAB process.

In addition, the prior capacitor component having a three-dimensional structure has the following problems.

The first problem is that a dielectric constant of a dielectric which may be used in the three-dimensional capacitor component may be relatively lower than that of a dielectric used in a multilayer ceramic capacitor (MLCC).

An oxide-nitride-oxide (ONO)-based dielectric used for the capacitor component having a three-dimensional structure may have a relatively low dielectric constant by 330 times than a barium titanate (BT)-based dielectric used in the multilayer capacitor.

Even when this dielectric constant is corrected with a breakdown voltage on the same thickness, the capacitor component having the three-dimensional structure may be inferior about 6.2 times.

An ONO-based dielectric film may be advantageous in that its thickness distribution, temperature characteristics, and long-term reliability are superior to those of the BT-based dielectric. Accordingly, the capacitor component having a three-dimensional structure, made using the electrochemical method, may be highly useful in a special product.

However, in order for the capacitor component having a three dimensional structure to be used in a wider range of products, it is necessary to overcome this problem caused by the dielectric constant lower than that of the multilayer capacitor.

The second problem is that as an internal electrode or the dielectric has a higher slenderness ratio (or aspect ratio, i.e. length/thickness), its product may have decreased productivity and conversely, an increased cost.

In order for the capacitor component having a three dimensional structure to implement higher capacitance than the multilayer capacitor having the same volume, it is necessary to increase an effective area by increasing the slenderness ratio of the internal electrode and the dielectric.

Here, the limited slenderness ratio may be a big problem in making the high-capacitance capacitor.

On the contrary, the capacitor component according to the present disclosure may have the following advantages.

First, it is possible to reduce its cost according to the manufacturing method. In all the processes, the capacitor component according to the present disclosure may implement the three-dimensional structure securing a high slenderness ratio at a lower cost.

The capacitor component of the present disclosure may have the lower production cost when compared to that of the prior art by avoiding a high-aspect ratio contact (HARC) etching or a growing process.

The capacitor component of the present disclosure may simultaneously remove a defect factor such as lifted, collapsed or biased pattern occurring in the growth process, thereby stably maintaining its high yield.

In addition, according to the present disclosure, it is possible to have a high degree of freedom in designing the capacitor component.

The capacitor component of the present disclosure may be manufactured as products of various sizes by using a single base material. Here, the wafer, which is an intermediate for manufacturing the capacitor component, may include the same repeating structure.

Therefore, it is possible to obtain a capacitor component having the same structure and a different size simply by changing a cutting interval to adjust a length of the wafer in the height direction when forming the wafer, or by adjusting a divided size of an individual chip component differently after forming the wafer.

That is, it possible to determine the size of the chip component during its manufacture, and it is thus also possible to simultaneously manufacture various chip components of different sizes.

In addition, when the capacitor component has the same structure, the capacitance of the capacitor component is linearly proportional to the volume of the capacitor component. Therefore, capacitor components of various capacitances may be manufactured using the single base material, and may thus have the high degree of freedom in design.

In addition, according to this exemplary embodiment, the metal may be applied to the surface of the wafer to form the first and second connecting conductive layers, thereby electrically connecting the conductive nanowires of the nanowires to each other.

Here, a surface open process may be performed on the wafer into a shape of a designed mask to determine a three-dimensional shape of the capacitor based on the shape of a designed mask.

In addition, in this exemplary embodiment, even when the nanowire has changed thickness and pitch, the material deposited on the nanowire may have a relatively uniform thickness by the atomic layer deposition (ALD) process.

In addition, this uniformity may be further improved while maintaining the overall shape of the capacitor component by adjusting a single open point of the mask.

Meanwhile, in the FAB process of the wafer, it is possible either to replace a component included in its basic structure with another necessary component or to easily reprocess the basic structure to fit the detailed structure, and it is also possible to dice the wafer into a necessary size by controlling the mask.

Figure 9A:
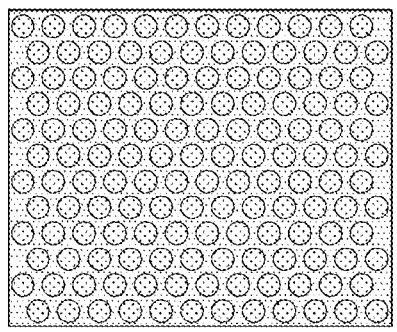
FIGS. 9A through 11B are views respectively exhibiting a degree of freedom in designing a capacitor component implemented by using a manufacturing method of the capacitor component according to the present disclosure.
Figure 9B:
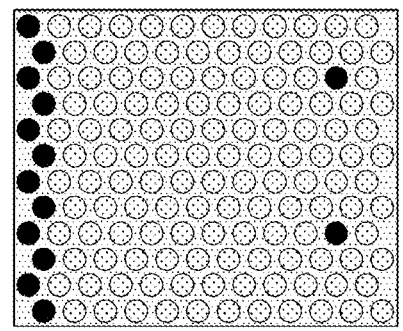
Figure 9C:
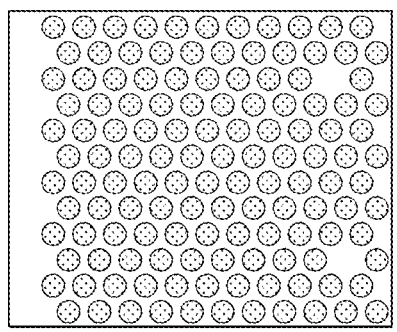
Figure 9D:
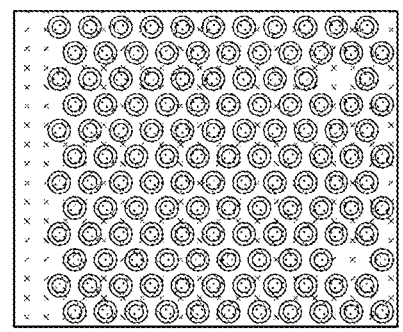
Figure 10A:
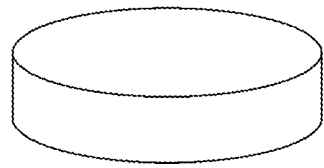
Figure 10B:
Figure 11A:
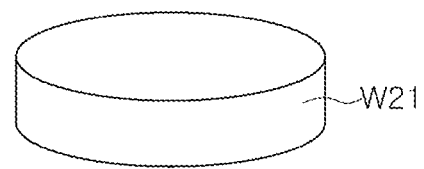
Figure 11B:
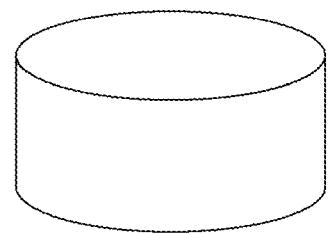

For example, as shown in FIGS. 9A and 9B, it is possible to control each diameter of wafers W11 and W12, thereby adjusting a size of a capacitor component manufactured using these wafers in the X or Y direction. In addition, as shown in FIGS. 10A and 10B, it is possible to control each thickness of wafers W21 and W22, thereby adjusting a height Z of a capacitor component manufactured using these wafers. In addition, as shown in FIGS. 11A and 11B, it is possible to dice even wafers W31 and W32 of the same size to have inner regions of different sizes.

In addition, in the capacitor component according to the present disclosure, the conductive body, which is the second electrode portion may surround the plurality of conductive nanowires serving as the first electrode portion interposing the dielectric film therebetween according to its manufacturing method. Therefore, an entire exterior of the capacitor component may be treated with the conductive material without any additional process.

Accordingly, it may be easy to design the capacitor component to be mounted on a board or the like, and the capacitor component itself may have strong durability and reliability against moisture and external impacts.

As set forth above, according to an exemplary embodiment of the present disclosure, it is possible to prepare the wafer including the conductive nanowire bundles in which the plurality of conductive nanowires are each covered with the glass, and it is thus possible to easily manufacture the smaller and high-capacitance capacitor component having a three-dimensional structure.

In the FAB process of the wafer manufactured according to this exemplary embodiment, it is possible either to replace a component included in its basic structure with another necessary component or to easily reprocess the basic structure to fit the detailed structure, and it is also possible to dice the wafer into a necessary size by controlling the mask. Therefore, the capacitor component of the present disclosure may have the increased degree of freedom in its design.

While the exemplary embodiments have been shown and described above, it will be apparent to those skilled in the art that modifications and variations could be made without departing from the scope of the present disclosure as defined by the appended claims.

What is claimed is:

1. A capacitor component comprising:
    a plurality of conductive nanowires disposed to be spaced apart from each other and including a metal, wherein at least one of the plurality of conductive nanowires includes a material different from that of at least another one of the plurality of conductive nanowires;
    first and second connecting conductive layers respectively disposed on one end and the other end of the plurality of conductive nanowires, and connected to the plurality of conductive nanowires;
    a conductive body surrounding the plurality of conductive nanowires; and
    a dielectric film disposed between the plurality of conductive nanowires, each of the first and second connecting conductive layers, and the conductive body,
    wherein the dielectric film and the conductive body fill an entirety of a space between adjacent conductive nanowires among the plurality of conductive nanowires.

2. The capacitor component of claim 1, wherein the conductive body includes a metal.

3. The capacitor component of claim 2, wherein the plurality of conductive nanowires each include at least one of nickel (Ni), cobalt (Co), titanium (Ti), tungsten (W), palladium (Pd) and copper (Cu).

4. The capacitor component of claim 2, wherein the conductive body includes at least one of nickel (Ni), cobalt (Co), titanium (Ti), tungsten (W), palladium (Pd) and copper (Cu).

5. The capacitor component of claim 4, wherein the plurality of conductive nanowires each include at least one of nickel (Ni), cobalt (Co), titanium (Ti), tungsten (W), palladium (Pd) and copper (Cu).

6. The capacitor component of claim 5, wherein the plurality of conductive nanowires each include nickel (Ni).

7. The capacitor component of claim 6, wherein the conductive body includes nickel (Ni).

8. The capacitor component of claim 2, wherein the remainder of the plurality of conductive nanowires each include a same material.

9. The capacitor component of claim 8, wherein the remainder of the plurality of conductive nanowires each include nickel (Ni).

10. The capacitor component of claim 1, wherein 10 µm or less is an average diameter of the plurality of conductive nanowires.

11. The capacitor component of claim 10, wherein 10% or less is a (Original) ratio of a difference between an average diameter of the one end of the plurality of conductive nanowires and an average diameter of the other end of the plurality of conductive nanowires to the average diameter of the plurality of conductive nanowires.

12. The capacitor component of claim 1, wherein 100 µm or more is an average distance from the one end of the plurality of conductive nanowires to the other end thereof.

13. The capacitor component of claim 1, wherein the dielectric film includes at least one oxide selected from the group consisting of tantalum (Ta), titanium (Ti), lanthanum (La), zirconium (Zr), barium (Ba), silicon (Si) and hafnium (Hf).

14. The capacitor component of claim 13, wherein the dielectric film is a multilayer film including an oxide film including an oxide, and a nitride film disposed on the oxide film and including silicon nitride (SiN).

15. A capacitor component comprising:
a first electrode portion including a plurality of conductive nanowires respectively extended in a first direction and spaced apart from each other in a second direction, perpendicular to the first direction, wherein the plurality of conductive nanowires include a metal, and at least one of the plurality of conductive nanowires includes a material different from that of at least another one of the plurality of conductive nanowires;
first and second connecting conductive layers respectively disposed on upper and lower ends of the plurality of conductive nanowires to connect the plurality of conductive nanowires to each other;
a dielectric film surrounding a side surface of each of the plurality of conductive nanowires; and
a second electrode portion filling a space in which the plurality of conductive nanowires are arranged spaced apart from each other between the first and second connecting conductive layers, and surrounding a side surface of the dielectric film,
wherein the space is filled entirely by the dielectric film and the second electrode portion.

16. The capacitor component of claim 15, wherein the second electrode portion is disposed in a region defined by each of the plurality of conductive nanowires and the first and second connecting conductive layers, in a state where the dielectric film is interposed therebetween, based on its cross section in a direction parallel to the first direction, and the second electrode portion surrounds each of the plurality of conductive nanowires, interposing the dielectric film therebetween, based on its cross section in a direction parallel to the second direction.

17. The capacitor component of claim 15, further comprising:
a protective layer covering the second electrode portion and the second connecting conductive layer;
a first terminal connected to the first connecting conductive layer and exposed outwardly of the protective layer; and
a second terminal connected to the second electrode portion and exposed outwardly of the protective layer.

18. The capacitor component of claim 17, wherein the second terminal is directly connected to the second electrode portion.

19. The capacitor component of claim 15, wherein at least one of the plurality of conductive nanowires has a shape of a circular pillar or a polygonal pillar.

20. The capacitor component of claim 15, wherein the plurality of conductive nanowires are bundled with each other to be a plurality of conductive nanowire bundles, and the plurality of conductive nanowire bundles are arranged in a repeating pattern based on their cross sections in the direction parallel to the second direction.

21. The capacitor component of claim 20, wherein in the plurality of conductive nanowire bundles, one of the conductive nanowires has an average diameter different from that of another one of the conductive nanowires.

22. A capacitor component comprising:
a plurality of conductive nanowires spaced apart from each other and including a metal, wherein at least one of the plurality of conductive nanowires includes a material different from that of at least another one of the plurality of conductive nanowires;
a dielectric film surrounding a side surface of each of the plurality of conductive nanowires;
a barrier metal film surrounding a periphery of the dielectric film;
a barrier dielectric film surrounding a periphery of the barrier metal film;
first and second connecting conductive layers respectively disposed on one end and the other end of the plurality of conductive nanowires, and connected to the plurality of conductive nanowires; and
a conductive body surrounding the plurality of conductive nanowires,
wherein the dielectric film, the conductive body, the barrier dielectric film, and the barrier metal film fill an entirety of a space between adjacent conductive nanowires among the plurality of conductive nanowires.

23. The capacitor component of claim 22, wherein the plurality of conductive nanowires further include a conductive ceramic material.

24. The capacitor component of claim 22, wherein the metal includes at least one selected from the group consisting of nickel (Ni), cobalt (Co), titanium (Ti), tungsten (W), palladium (Pd), and copper (Cu).

25. The capacitor component of claim 23, wherein the conductive ceramic material includes at least one of titanium nitride (TiN) and tungsten nitride (WN).

* * * * *